United States Patent [19]

Yokote

[11] Patent Number: 4,607,863
[45] Date of Patent: Aug. 26, 1986

[54] PASSIVE SEAT BELT SYSTEM
[75] Inventor: Yoshihiro Yokote, Yokohama, Japan
[73] Assignee: NSK-Warner K.K., Japan
[21] Appl. No.: 709,910
[22] Filed: Mar. 8, 1985
[30] Foreign Application Priority Data
Mar. 13, 1984 [JP] Japan .............................. 59-34815[U]
[51] Int. Cl.$^4$ ............................................ B60R 22/06
[52] U.S. Cl. .................................... 280/804; 297/473
[58] Field of Search ................ 280/802, 804; 297/473, 297/483

[56] References Cited
U.S. PATENT DOCUMENTS

| 4,039,224 | 8/1977 | Bauer et al. | 297/469 |
| 4,040,645 | 8/1977 | Giffen et al. | 280/803 |
| 4,256,331 | 3/1981 | Schwanz et al. | 280/804 |
| 4,264,089 | 4/1981 | Maekawa et al. | 280/803 |
| 4,278,273 | 7/1981 | Schiff | 280/802 |
| 4,281,853 | 8/1981 | LeVeux | 280/804 |
| 4,302,031 | 11/1981 | Nishimura et al. | 280/804 |
| 4,354,696 | 10/1982 | Volk et al. | 280/804 |
| 4,436,323 | 3/1984 | Yamamoto | 280/804 |
| 4,456,283 | 6/1984 | Michael et al. | 280/804 |

FOREIGN PATENT DOCUMENTS

0092105A1 10/1983 European Pat. Off. .
2739914A1 3/1979 Fed. Rep. of Germany .
3005818A1 10/1981 Fed. Rep. of Germany .
3149518A1 6/1983 Fed. Rep. of Germany .
58-14131 3/1983 Japan .

Primary Examiner—John J. Love
Assistant Examiner—Kenneth R. Rice
Attorney, Agent, or Firm—Wegner & Bretschneider

[57] ABSTRACT

A passive seat belt system includes a guide rail, a movable anchor, drive means for causing the anchor to travel along the rail, a base to be mounted on a vehicle body and equipped with plural interlocking portions arranged with a vertical interval when mounted on the vehicle body, and a support member displaceable between an engagement position, at which the member engages either one of the interlocking portions of the base so as to restrain an occupant with a webbing fastened to the anchor, and a non-engagement position. The member is composed of a single rod-like member which in the event of emergency, engages the anchor assuming the occupant-restraining position so as to transmit a load exerted on the anchor to the vehicle body by way of the base. The above system permits, with a relatively simple and compact structure, easy wearing and release of a webbing without need for occupant's hands and change of the holding position of the anchor depending on the physical constitution of the occupant.

11 Claims, 7 Drawing Figures

PASSIVE SEAT BELT SYSTEM

BACKGROUND OF THE INVENTION (1) Field of the Invention

This invention relates to a passive seat belt system making use of an adjustable anchor unit.

(2) Description of the Prior Art:

In a seat belt system, the optimum position of its anchorage may vary depending on the physical constitution of each occupant and the like when wearing its webbing or webbings (particularly, its shoulder webbing). With the foregoing in view, there have been known seat belt systems in each of which the holding position of its anchor supporting its webbing thereon is adjustable, namely, so-called active seat belt system. If one uses without any modification an adjustable anchor unit, which is used in an active seat belt system, to adjust the holding position of a movable anchor (by which a webbing is guided) employed in a passive seat belt system, the structure of the passive seat belt system may be rendered complex.

SUMMARY OF THE INVENTION

The present invention has been completed with the foregoing in view. An object of this invention is to incorporate an adjustable anchor in the so-called passive seat belt system so as to provide a passive seat belt system equipped with an anchor unit which makes the first position of an occupant-restraining movable anchor displaceable in a direction perpendicular to the length of a vehicle, is of a simple structure but has sufficient strength, and is capable of holding the movable anchor at a predetermined position without failure in the event of emergency such as vehicle collision or the like.

In one aspect of this invention, there is thus provided a passive seat belt system which comprises:

a guide rail to be mounted on a vehicle body;

a movable anchor provided displaceably along the guide rail and connected with a webbing;

drive means for causing the movable anchor to travel between either one of a plurality of first positions, at which the webbing is brought into engagement with an occupant to restrain the occupant, and a second position at which the webbing is out of engagement with the occupant to release the occupant;

a base to be mounted on the vehicle body, said base being equipped with a plurality of interlocking portions which are arranged with an interval in the up-to-down direction of the vehicle body when mounted on the vehicle body; and a support member displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being composed of a single rod-like member which in the event of emergency, is brought into engagement with the movable anchor assuming the first position so as to transmit a load exerted on the movable anchor to the vehicle body by way of the base.

The present invention has brought about such advantageous effects that it can enjoy, with a relatively simple and compact structure, the merit of a passive seat belt system, namely, the permission of easy wearing and release of a webbing without need for occupant's hands and the merit of an adjustable anchor unit, namely, the permission of change of the holding position of a movable anchor depending on the physical constitution of the occupant or the like, while holding the movable anchor without failure at either one of a plurality of first positions so as to protect the occupant safely even in the event of vehicle emergency.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
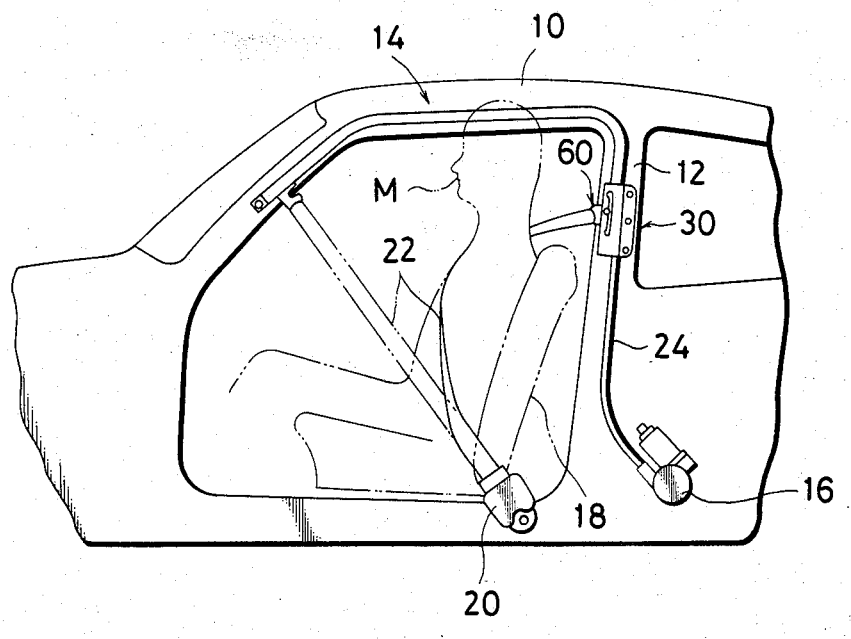
FIG. 1 is a simplified schematic overall illustration of a passive seat belt system according to one embodiment of the present invention.
Figure 4:
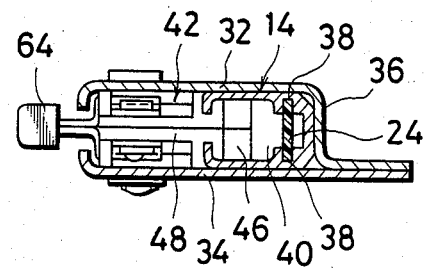
FIG. 4 is a cross-sectional view taken along line IV—IV of FIG. 3.

In FIG. 1 illustrating the passive seat belt in its entirety, a guide rail 14 is provided along a side roof 10 and onto a center pillar 12. A movable anchor (runner) 60 is slidably provided on the guide rail 14. The movable anchor 60 can be held by the an adjustable anchor unit 30 provided on the center pillar 12 and is driven by a drive tape 24 which is in turn driven by a motor 16 (drive means is composed by a motor 16 and drive tape 24 as will be described in detail herein). A retractor 20 is fixedly provided beside a seat 18, whereby taking up or paying out a webbing (shoulder webbing) 22. The free end of the webbing 22 is connected to the movable anchor 60.

The adjustable anchor unit 30 will next be described with reference to FIG. 2 to FIG. 5. A pair of bases 32,34 are fixed on the center pillar 12 by means of bolts or the like. One of the bases, namely, the base 34 is planar but the other base, namely, the base 32 defines a shoulder portion 36. Thus, a spacing which extends along the length of the center pillar 12 is defined between both of the bases 32,34. The guide rail 14, slider 42, control lever 52 and the like are arranged within this spacing.

The guide rail 14 defines guide grooves 38 for guiding the drive tape 24 and a guide spacing 40 for guiding a slider 42 which will next be described. The guide rail 14 is fixed at its rear end portion on the bases 32,34. The slider 42 has a first portion 46 fit in the guide spacing 40 and a second portion 48 located outside the guide spacing 40 and in the spacing between the base 32 and the base 34. On the second portion 48 of the slider 42, one of legs of a control lever 52, namely, a leg 54 is pivotally attached by a pin 50. The control lever 52 is composed of two plates and takes a T-like configuration as a whole. The control lever 52 is located in the spacing between the base 32 and the base 34. On the other leg 56 of the control lever 52, an interlocking pin 58 is provided upright as a support member for a movable anchor 60. On the other hand, a control handle 64 is formed at the head portion of the control lever 52. The control lever 52 is biased counterclockwise by a torsion coil spring 65 arranged between itself and the slider 42. On the slider 42, there is also provided a switch 67 which is turned off to control the rotation of the motor 16 when the movable anchor 60 has moved to its most retreated position Through each of the bases 32,34, there is formed a slot 70 extending in the lengthwise direction of the base, namely, along the length of the center pillar 12. Furthermore, interlocking notches 72,74,76 are also formed as substantially semi-circular interlocking portions respectively at both upper and lower ends and longitudinal midpoint of the slot 70. Therefore, the interlocking pin 58 is allowed to move along the slot 70 and to engage either one of the interlocking notches. At one of side edges defining the opening of an interlocking indentation 84 of the movable anchor 60, there is formed a tapered portion 85 which is tilted toward the moving direction of the movable anchor 60.

Within the spacing between the bases 32,34 and above the slider 42, the movable anchor 60 is arranged. The movable anchor 60 has a sliding portion 78 which slides within the guide rail 14, an extension 80 which projects out through an opening between the bases 32,34, and lugs 82,82 which extend through the drive tape 24 and engage the same. In the lower edge of the extension 80, the interlocking indentation 84 is formed substantially at a right angle with respective to the length of the extension 80.

The operation of this embodiment will next be described. In a typical moving mode, the drive tape 24 has been paid out, before the occupant M gets on the vehicle, by the motor 16 so that the movable anchor 60 and webbing 22 are respectively at their frontmost positions on the guide rail 14 as shown by two-dot chain lines in FIG. 1. When the occupant sits on the seat 18 and then closes the door, the closure of the door actuates the motor 16 and hence takes up the drive tape 24. Thus, the movable anchor 60 travels along the guide rail 14 and reaches the first position (the most retreated position) indicated by solid lines in FIG. 1. As a result, the webbing 22 restrains the occupant M at an area extending from his right shoulder to his lap.

The first position of the movable anchor 60 is determined by the engagement between the interlocking indentation 84 of the movable anchor 60 and the interlocking pin 58 of the control lever 52. As soon as the movable anchor 60 reaches the first position thereof, the switch is turned off to stop the rotation of the motor 16 and hence to stop the movable anchor 60 there. In the final stage of the above movement of the movable anchor 60, the tapered portion 85 engages the interlocking pin and causes the interlocking pin 58 to move aside by a force component exerted by the movable anchor 60, whereby to push the interlocking pin 58 into the interlocking notch 76 without failure. If this tapered portion 85 should not be provided, there would be a danger that the interlocking pin 58 would remain at either of the ends of the slot 70 and would not be pushed smoothly into the interlocking notch 76. Here, the interlocking pin 58 is kept in engagement with the intermediate interlocking notch 76 out of the three interlocking notches 72,74,76. Therefore, the holding position (height) of the movable anchor 60 is at the middle level.

In the case of emergency of the vehicle (for example, upon vehicle collision), a force is applied frontward (i.e., leftward in FIG. 5) from the webbing 22 to the movable anchor 60. This force is transmitted from the interlocking pin 58, via the bases 32,34, to the vehicle body, where the force is absorbed. In this manner, the interlocking pin 58 defines the first position of the movable anchor 60 and at the same time, bears a load to be exerted to the movable anchor 60 in the event of emergency. This is very meaningful. If one tries to achieve the above two functions with separate members (such an attempt is of course feasible), the overall structure of the anchor unit 30 would be unavoidably complex and voluminous.

When the occupant M gets off the vehicle, he opens the door. This opening of the door causes the motor 16 to rotate, whereby paying out the drive tape 24. The movable anchor 60 is thus caused to travel frontward to the second position along the guide rail 14, thereby allowing the webbing 22 to assume its release position indicated by two-dot lines in FIG. 1.

A further description will next be made on a mode in which the first position of the movable anchor 60 is changed. For changing the first position of the movable anchor 60, it is necessary to change the position of the interlocking pin 58. For this purpose, it is necessary to shift the slider 42 and control lever 52 as unitary members. In order to shift the slider 42 and control lever 52, it is necessary to push the control handle 64 rearward and to turn the control lever 52 clockwise about the pin 50. This causes the interlocking pin 58 to disengage from the middle interlocking notch 76. When the slider 42 and control lever 52 are shifted either upward or downward and the pressing force to the control handle 64 is then released, the control lever 52 is turned leftwafd owing to the action of the spring 65 and the interlocking pin 58 is brought into engagement with either upper interlocking notch 72 or lower interlocking notch 74.

Figure 6:
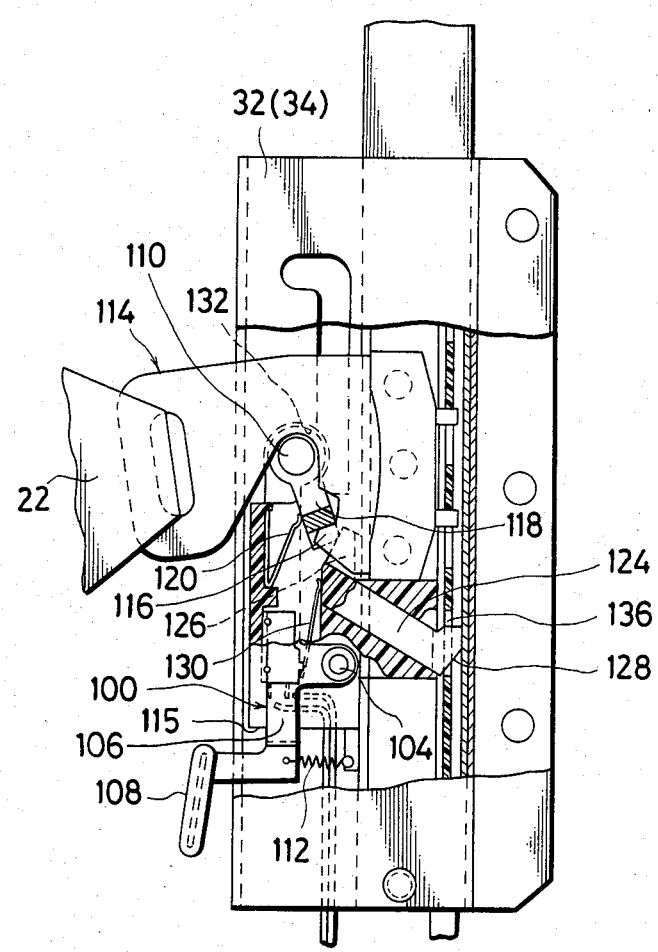
FIG. 6 is a partially cut-away view corresponding to FIG. 5 and shows a passive seat belt system according to another embodiment of this invention.

Another embodiment of this invention will next be described with reference FIGS. 6 and 7. This embodiment is different from the former embodiment in that the latter embodiment additionally includes a roll-over latch capable of latching without failure the movable anchor at a position at which the movable anchor is brought into engagement with the adjustable anchor unit. Describing in detail, a control lever 100 includes an extension 106 extending linearly and pivoted at an intermediate part thereof on a pin 104, and a control handle 108 projecting out through the opening between the base 32 and base 34. An interlocking pin 110 is provided upright on one end of the extension 106. Furthermore, the control lever 100 is coupled as a unitary part with a slider 115 and is biased counterclockwise by a spring 112. On the interlocking pin 110, there is pivotally attached a latch piece 118 which is engageable with a jaw portion 116 of a movable anchor 114. This latch piece 118 is biased counterclockwise by a spring 120. In the vicinity of the interlocking pin 110 and latch piece 118, a latch actuator 124 is arranged in such a way that the latch actuator 124 is displaceable in a direction tilted at a predetermined angle with respect to the moving direction of the movable anchor 114 (i.e., in the vertical direction as seen in FIG. 6). The latch actuator 124 defines at one end thereof a cam portion 126 for turning the latch piece 118 between its latching position and non-latching position, and at the other end thereof a drive portion 128 either kept in contact with the drive tape 24 or extending through a hole 136 of the drive tape 24. The latch actuator 124 is normally biased by a spring 130 in a direction in which the cam portion 126 does not engage the latch piece 118.

In this embodiment, the position of the movable anchor 114 is determined by the engagement between an interlocking indentation 132 of the movable anchor 114 and the interlocking pin 110. Similar to the above embodiment, the engagement between the interlocking pin 110 and the interlocking indentation 132 can be released by manipulating the control handle 108 to turn the control lever 100 clockwise about the pin 104. When the movable anchor 114 reaches its first position, the latch piece 118 turns counterclockwise and engages the jaw portion 116 of the movable anchor 114 owing to the action of the spring 120 because as illustrated in FIG. 6, the latch actuator 124 is at its retreated position in which the drive portion 128 of the latch actuator 124 is fit in the hole 136 of the drive tape 24 (namely, to the position displaced downwardly and rightwardly as illustrated in FIG. 6). This engagement between the latch piece 118 and the jaw portion 116 prevents the movable anchor 114 from moving upward accidentally.

Figure 7:
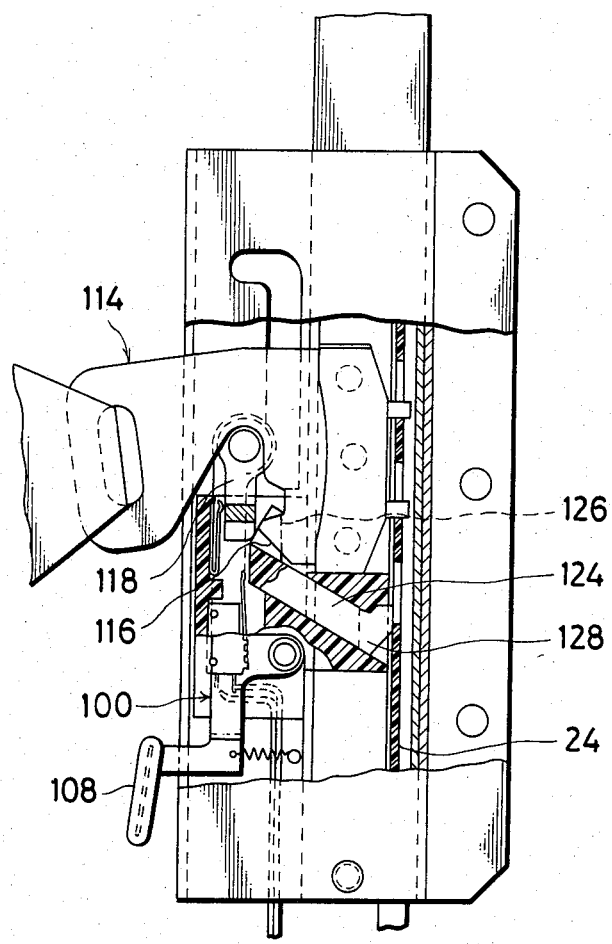
FIG. 7 is similar to FIG. 6 but shows the passive seat belt system in a different stage of operation.

When the drive tape 24 is driven upward, the latch actuator 124 is however caused to advance by the corresponding surface of the drive tape 24 as shown in FIG. 7 and its cam portion 126 causes the latch piece 118 to turn clockwise. As a result, the engagement between the latch piece 118 and the jaw portion 116 of the movable anchor 114 is released, thereby allowing the movable anchor 114 to move freely.

It should be borne in mind that the above embodiments have been given merely by way of example and the present invention should thus not be interpreted limitingly within these embodiments. Needless to say, the present invention may be suitably modified or improved so long as the spirit of the invention is not impaired.

Figure 2:
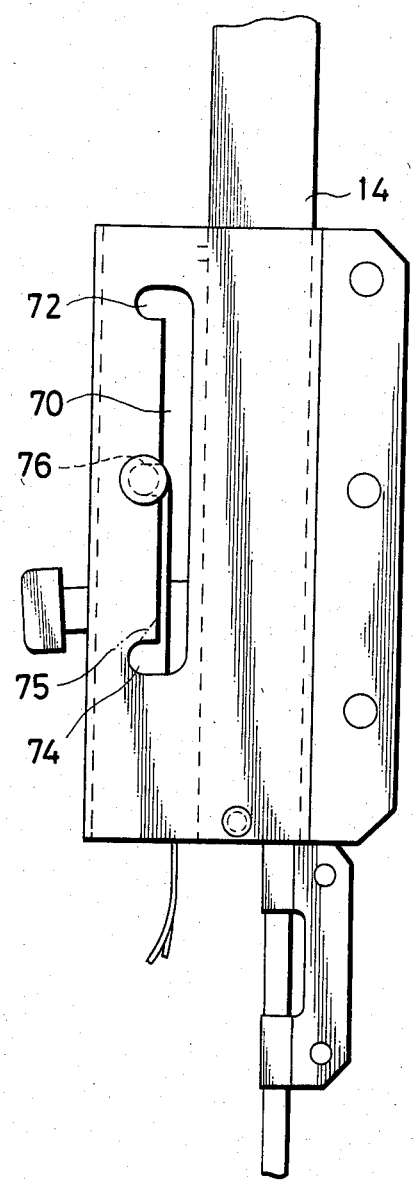
FIG. 2 is an enlarged fragmentary view of the passive seat belt system of FIG. 1.
Figure 3:
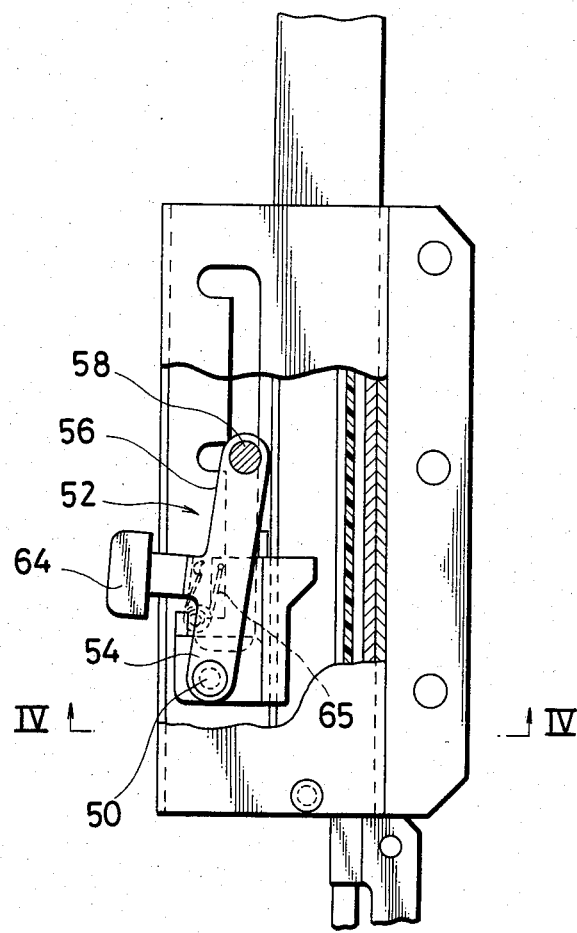
FIG. 3 is a partially cut-away view of FIG. 2.
Figure 5:
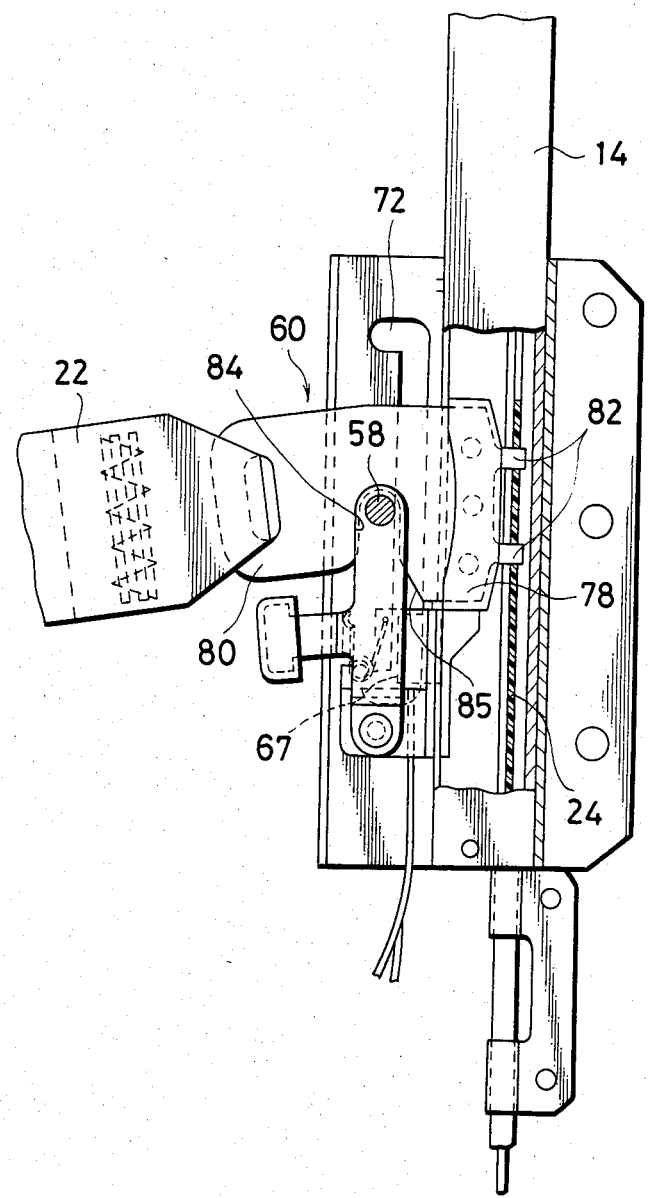
FIG. 5 is a partially cut-away view for describing the operation of the passive seat belt system.

For example, the provision of a tapered portion 75 at the entrance of at least the lower interlocking notch 74 as shown by a two-dot line in FIG. 2 will facilitate and ensure the operation for pushing the interlocking pin 58 into the interlocking notch 74 by the tapered portion 85 of the movable anchor 60.

Having now fully described the invention, it will be apparent to one of ordinary skill in the art that many changes and modifications can be made thereto without departing from the spirit or scope of the invention as set forth herein.

What is claimed is:

1. A passive seat belt system comprising:
   a guide rail to be mounted on a vehicle body;
   a movable anchor provided displaceably along the guide rail and connected with a webbing;
   drive means for causing the movable anchor to travel between either one of a plurality of first positions, at which the webbing is brought into engagement with an occupant to restrain the occupant, and a second position at which the webbing is out of engagement with the occupant to release the occupant;
   a base to be mounted on the vehicle body, said base being equipped with a plurality of interlocking portions which are arranged with an interval in the up-to-down direction of the vehicle body when mounted on the vehicle body; and
   a support member displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being composed of a single rod-like member which in the event of emergency, is brought into engagement with the movable anchor assuming the first position so as to transmit a load exerted on the movable anchor to the vehicle body by way of the base.

2. A passive seat belt system as claimed in claim 1, further comprising a latch piece provided on the support member in such a way that the latch piece is displaceable between a stopping position, at which the latch piece is brought into engagement with the movable anchor so as to prevent the movement of the movable anchor from the first position to the second position, and a non-stopping position at which the latch piece is kept out of engagement with the movable anchor.

3. A passive seat belt system as claimed in claim 2, further comprising an actuator for bringing the latch piece from the stopping position to the non-stopping position upon actuation of the drive means.

4. A passive seat belt system comprising:
   a guide rail to be mounted on a vehicle body;
   a movable anchor provided displaceably along the guide rail and connected with a webbing;
   drive means for causing the movable anchor to travel between either one of a plurality of first positions, at which the webbing is brought into engagement with an occupant to restrain the occupant, and a second position at which the webbing is out of engagement with the occupant to release the occupant;
   a base to be mounted on the vehicle body, said base being equipped with a substantially-rectangular cylindrical member, having a plurality of interlocking portions which are arranged in each of a pair of mutually-opposing side walls of the substantially-rectangular cylindrical member with an interval in the up-to-down direction of the vehicle body when mounted on the vehicle body, and being capable of receiving a part of the movable anchor in the substantially-rectangular cylindrical member and defining an opening for an extension of the movable anchor which extension extends outward from the substantially-rectangular cylindrical member; and
   a support member provided through the pair of mutually-opposing side walls of the substantially-rectangular cylindrical member and being displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being, in the event of emergency, engageable with the movable anchor assuming the first position so as to transmit a load exerted on the movable anchor to the vehicle body by way of the base.

5. A passive seat belt system as claimed in claim 4, wherein the interlocking portions are interlocking notches extending along the length of the vehicle body when mounted on the vehicle body and the base further defines a slot extending to each of the interlocking notches.

6. A passive seat belt system as claimed in claim 4, further comprising a latch piece provided on the support member in such a way that the latch piece is displaceable between a stopping position, at which the latch piece is brought into engagement with the movable anchor so as to prevent the movement of the movable anchor from the first position to the second position, and a non-stopping position at which the latch piece is kept out of engagement with the movable anchor.

7. A passive seat belt system as claimed in claim 6, further comprising an actuator for bringing the latch piece from the stopping position to the non-stopping position upon actuation of the drive means.

8. A passive seat belt system comprising:
a guide rail to be mounted on a vehicle body;
a movable anchor provided displaceably along the guide rail and connected with a webbing;
drive means for causing the movable anchor to travel between either one of a plurality of first positions, at which the webbing is brought into engagement with an occupant to restrain the occupant, and a second position at which the webbing is out of engagement with the occupant to release the occupant;
a base to be mounted on the vehicle body, said base being equipped with a plurality of interlocking portions which extend along the length of the vehicle body and are arranged with an interval in the up-to-down direction of the vehicle body when mounted on the vehicle body; and
a support member displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being, in the event of emergency, engageable with the movable anchor assuming the first position so as to transmit a load exerted on the movable anchor to the vehicle body by way of the base;
said movable anchor defining an interlocking indentation which extends in a direction perpendicular to the length of the vehicle body and is kept in engagement with the support member when the movable anchor assumes any one of the first positions, and said interlocking indentation preventing the movement of the support member to the non-engagement position.

9. A passive seat belt system comprising:
a guide rail to be mounted on a vehicle body;
a movable anchor provided displaceably along the guide rail and connected with a webbing;
drive means for causing the movable anchor to travel between either one of a plurality of first positions, at which the webbing is brought into engagement with an occupant to restrain the occupant, and a second position at which the webbing is out of engagement with the occupant to release the occupant;
a base to be mounted on the vehicle body, said base being equipped with a plurality of interlocking portions which are arranged with an interval in the up-to-down direction of the vehicle body when mounted on the vehicle body; and
a support member displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being, in the event of emergency, engageable with the movable anchor assuming the first position so as to transmit a load exerted on the movable anchor to the vehicle body by way of the base;
said movable anchor defining a guide surface tilted toward the moving direction thereof, and said guide surface forcing the support member assuming the non-engagement position to engage either one of the interlocking portions of the base when the movable anchor has been caused to travel toward the first position.

10. A passive seat belt system as claimed in claim 9, wherein the base defines an interlocking part extending along the length of the vehicle body and capable of receiving the support member therein, and the interlocking part defines at an upper portion thereof a surface having an inclination which opens toward the non-engagement position of the support member.

11. A passive seat belt system comprising:
a guide rail to be mounted on a vehicle body;
a movable anchor provided displaceably along the guide rail and connected with a webbing;
drive means for causing the movable anchor to travel between either one of a plurality of first positions, at which the webbing is brought into engagement with an occupant to restrain the occupant, and a second position at which the webbing is out of engagement with the occupant to release the occupant;
a base to be mounted on the vehicle body, said base being equipped with a plurality of interlocking portions which are arranged with an interval in the up-to-down direction of the vehicle body when mounted on the vehicle body;
a support member displaceable between an engagement position, at which the support member is brought into engagement with either one of the interlocking portions of the base so as to determine the first position of the movable anchor, and a non-engagement position at which the support member is kept out of engagement with any of the interlocking portions of the movable anchor, said support member being, in the event of emergency, engageable with the movable anchor assuming the first position so as to transmit a load exerted on the movable anchor to the vehicle body by way of the base; and
a latch piece provided on the support member in such a way that the latch piece is displaceable between a stopping position, at which the latch piece is brought into engagement with the movable anchor so as to prevent the movement of the movable anchor from the first position to the second position, and a non-stopping position at which the latch piece is kept out of engagement with the movable anchor;

said movable anchor defining an interlocking indentation, which extends substantially in a direction perpendicular to the length of the vehicle body and is kept in engagement with the support member when the movable anchor assumes the first position, and a jaw portion in an edge of the interlocking indentation at a point where the latch piece is kept in engagement with the jaw portion when the movable anchor assumes the first position and the latch piece assumes the stopping position, said interlocking indentation preventing the movement of the support member to the non-engagement position and said latch piece engaging the indentation.

* * * * *